United States Patent

[11] 3,612,411

| [72] | Inventors | Georg-Wilhelm Oetjen<br>Cologne-Marienburg;<br>Franz-Joseph Schmitz, Weiden; Hanns<br>Eilenberg, Rosrath, all of Germany |
|---|---|---|
| [21] | Appl. No. | 847,987 |
| [22] | Filed | Aug. 6, 1969 |
| [45] | Patented | Oct. 12, 1971 |
| [73] | Assignee | Leybold-Heraeus-Verwaltung GmbH<br>Cologne-Bayental, Germany |
| [32] | Priority | Aug. 6, 1968 |
| [33] | | Germany |
| [31] | | P 17 79 393.0 |

[54] CONTINUOUS FREEZE DRYER
14 Claims, 4 Drawing Figs.

[52] U.S. Cl. .................................................. 241/23,
34/15, 34/92, 34/164, 241/24, 241/76
[51] Int. Cl. ...................................................... B02c 11/08

[50] Field of Search............................................. 34/5, 15,
12, 92, 164; 241/76, 78, 80, 23, 24

[56] References Cited
UNITED STATES PATENTS

| 2,751,687 | 6/1956 | Colton......................... | 34/5 |
| 2,847,767 | 8/1958 | Carrier......................... | 34/164 |
| 3,151,955 | 10/1964 | Fleissner...................... | 34/164 |

*Primary Examiner*—Frederick L. Matteson
*Assistant Examiner*—Ronald C. Capossela
*Attorney*—Spencer & Kaye

ABSTRACT: A continuous freeze-drying apparatus and method utilizes a vacuum chamber within which large chunks of frozen material are comminuted into particles of a desired size, are screened within the chamber to separate particles of other than the desired size, and are heated within the chamber to evaporate moisture and to freeze dry them.

INVENTORS.
Georg-Wilhelm Oetjen
Franz-Josef Schmitz
Hanns Eilenberg

Spencer & Kaye
BY                ATTORNEYS.

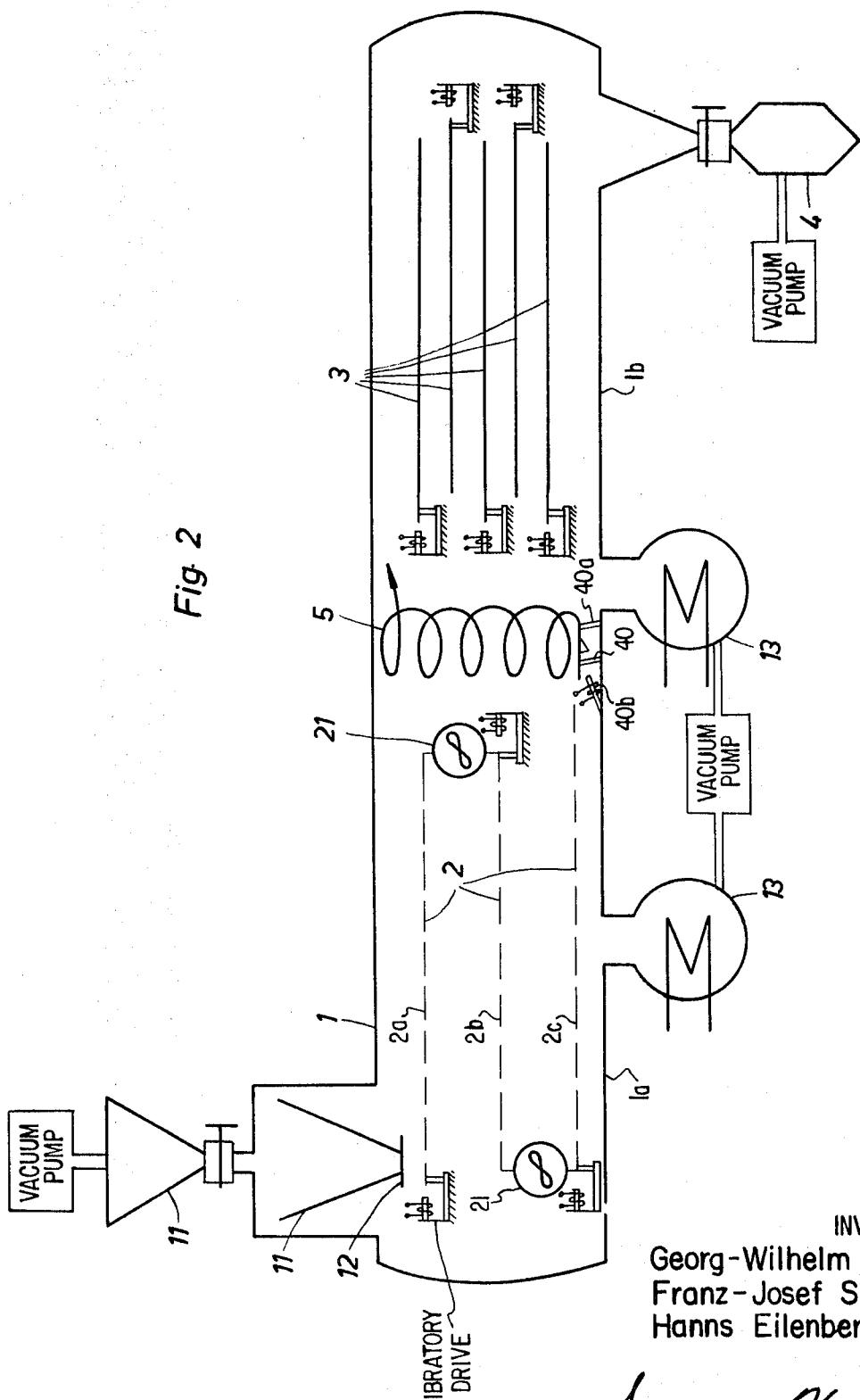

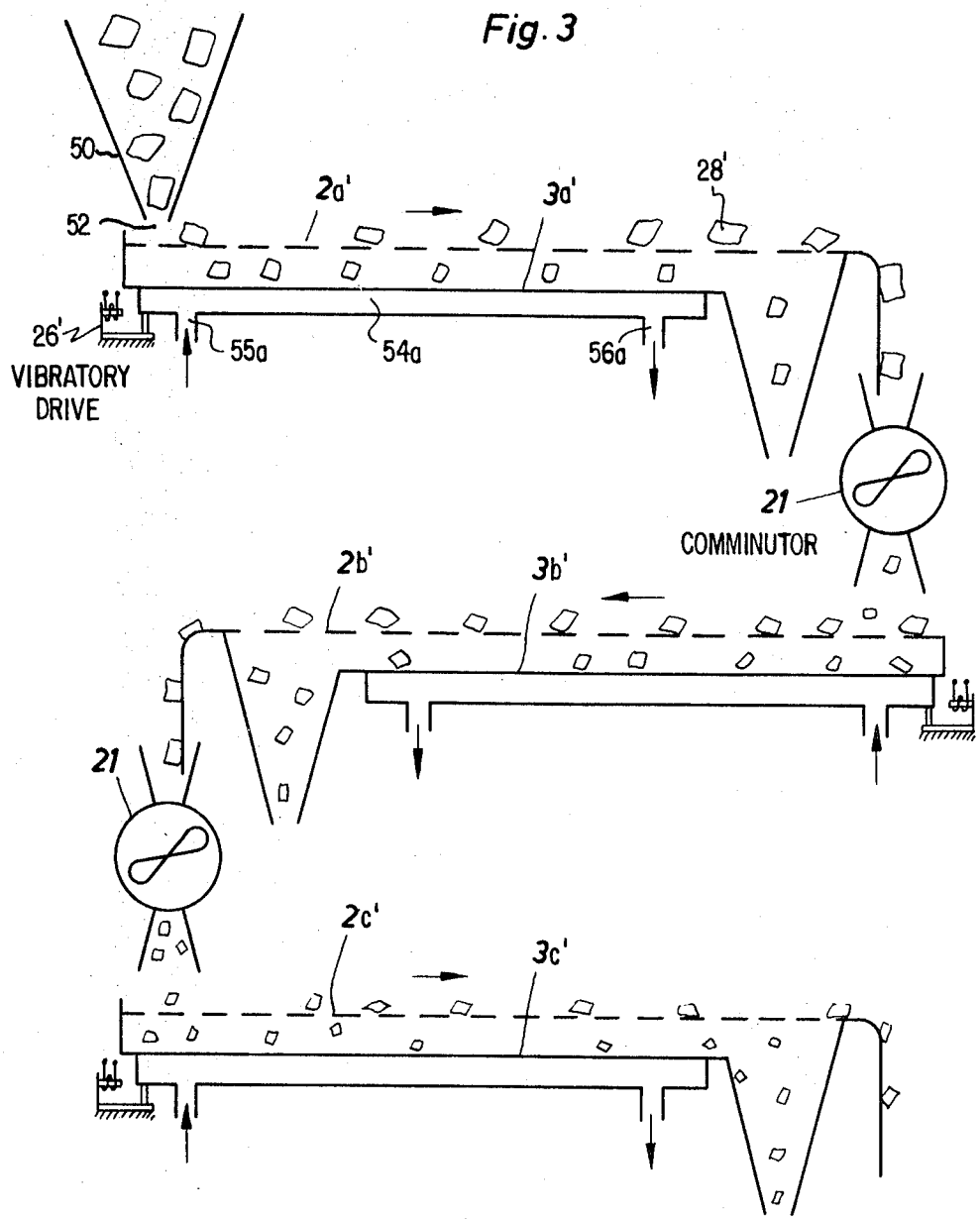

CONTINUOUS FREEZE DRYER

BACKGROUND OF THE INVENTION

This invention relates to a method and apparatus for continuously freeze-drying particles, and more particularly to a method and apparatus in which the product, after being frozen outside the vacuum drying chamber into relatively large chunks is brought into the chamber and comminuted into particles of appropriate size for drying.

Particles to be freeze dried within vacuum chambers are conventionally frozen into relatively large pieces which are subsequently comminuted into particles of appropriate size for freeze drying before they are inserted into the vacuum drying chamber. Fine particles, of less than the optimum size for drying, which are produced during the grinding or comminuting process, are screened out before the particles are inserted into the vacuum chamber.

Particles have also been comminuted within a grinding device located within a chamber which may be evacuated by a connecting line connected to the vacuum chamber and sealed off from the vacuum chamber by vacuum-type locks.

The above-mentioned processes have the disadvantage that considerable machinery is required to freeze, grind, and screen the particles outside of the vacuum drying chamber. In particular, difficulties arise because thawing of even a small amount of a product must be avoided because this can have a significant effect on the quality of the end product. The products which are freeze dried are often quite sensitive to such thawing. Accordingly, a cooling chamber for maintaining appropriate temperatures for prevention of thawing may be necessary. In particular, when larger chunks of the product are ground in a comminuter located on top of a vacuum chamber difficulties arise in maintaining a vacuum type seal between the comminution device and the vacuum chamber.

SUMMARY OF THE INVENTION

Among the objects of the present invention are the provision of a method and an apparatus for continuous freeze drying in which the above-mentioned drawbacks are eliminated.

Briefly stated these and other objects of the invention are achieved by feeding the material which has been frozen in large chunks outside of the vacuum drying chamber into the chamber, comminuting it into appropriate particle sizes within the chamber and then screening it and freeze drying it by adding the latent heat of evaporation.

This method takes advantage of the fact that through use of the vacuum in the vacuum drying chamber the latent heat of evaporation is not added to the material before it comes to the heated drying beds. This is because the absolute pressure of the vacuum space is lower than the water-vapor pressure of the product which is equivalent to the temperature where the product is treated. Accordingly thawing cannot occur.

BRIEF DESCRIPTION OF THE DRAWINGS

FIG. 2 is a sectional view, also somewhat schematic, of apparatus according to another embodiment of the invention.

FIG. 3 is a sectional view, also somewhat schematic, of apparatus according to still another embodiment of the invention.

DESCRIPTION OF PREFERRED EMBODIMENTS

Figure 1:
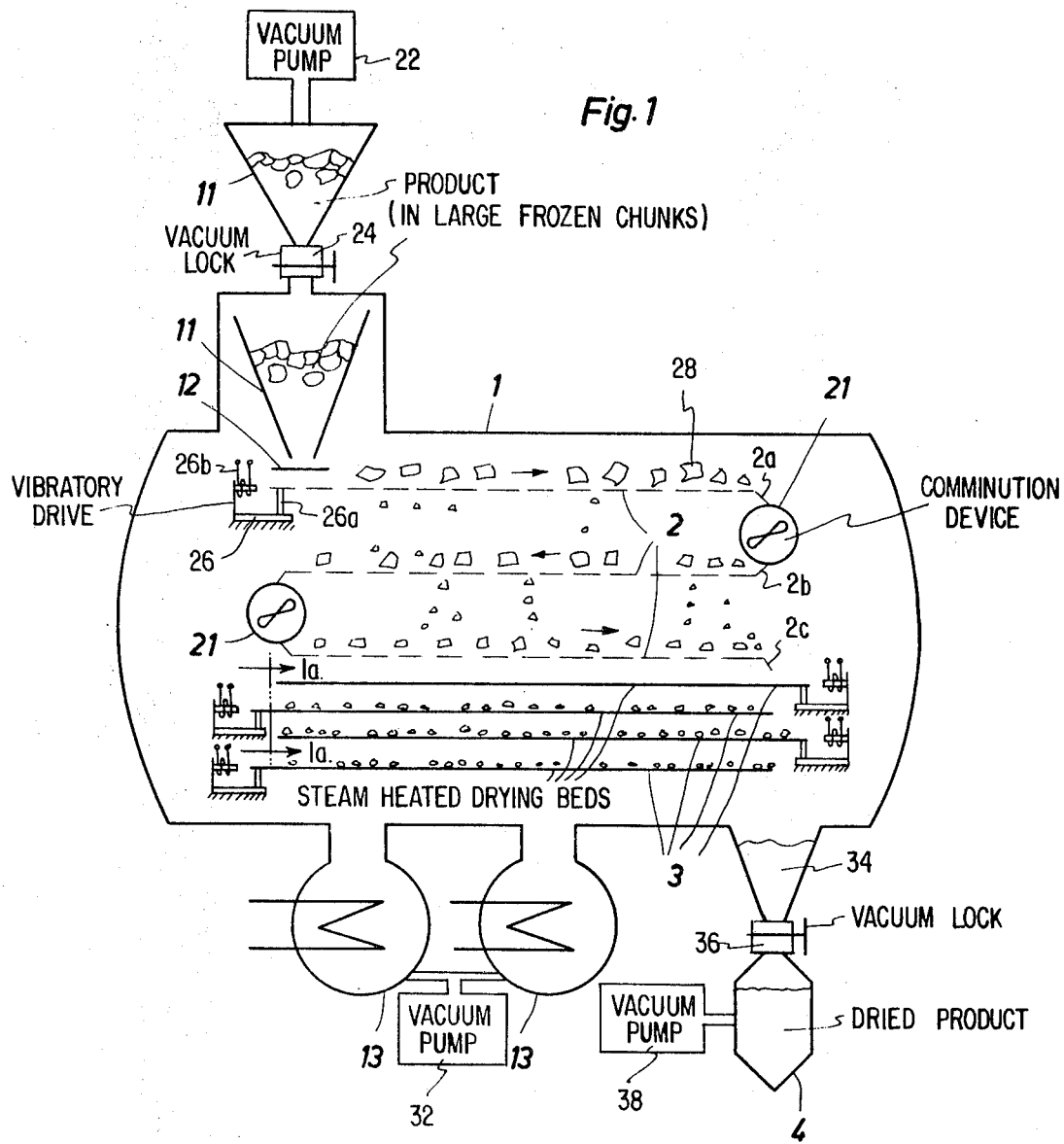
FIG. 1 is a sectional view, illustrating in a schematic fashion apparatus of the present invention.
Figure 1A:
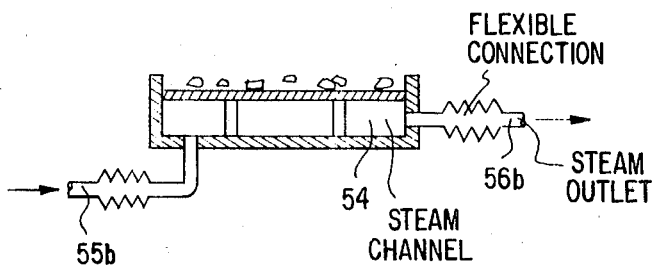
FIG. 1a is a sectional view, illustrating in a schematic a vibratory drying bed with means for heat inlet and outlet.

Referring now to FIG. 1 there will be seen a vacuum chamber 1 which is provided in its upper wall with an automatic feed hopper 11, which has a vacuum pump 22 and has a vacuum lock 24, connecting it and the interior of the chamber. An internal feed hopper 11a is located within vacuum chamber 1 below the vacuum lock 24 and has a discharge opening 12 at its bottom. The initial end of a first screening conveyor section 2a is located below discharge opening 12. At the terminal end of screening conveyor section 2a is located the input of a comminution device 21. At the output of comminution device 21 there is located the initial end of a second conveyor screening section 2b. The input end of a second comminution device 21 is located at the terminal end of second conveyor screening section 2b. The initial end of a third conveyor screening section 2c is located at the output of second comminution device 21.

A vibratory drive mechanism 26 is connected to each of the conveyor screening sections 2a, 2b, and 2c. Any conventional vibratory drive mechanism may be used. Such devices have a slow forward, quick return action which may be supplied by a leaf spring 26a and an electromagnet 26b which is periodically energized by an AC signal. As a result particles on the conveyor move with the conveyor during the slow forward motion, but remain in position due to their inertia during the quick return action. Each of the screening conveyor sections has openings 28 which are equal in size to the optimum size of particles for drying. At the terminal end of the last conveyor screening section 2c is located the initial end of the first of four vibratory drying beds 3 which are arranged one below the other, and below the conveyor screening sections 2. A vibratory drive mechanism 26 is connected to each of the drying beds 3. Each vibratory drive mechanism 26, both on the conveyor screening sections 2 and on the vibratory drive drying bed conveyors 3 is arranged so that the particle movement caused by each is in a direction opposite to that of the conveyor section immediately above or below it.

A heating chamber 54b is formed on the lower side of drying bed 3 and has an inlet 55b and an outlet 56b for a heating fluid such as hot steam.

A hopper 34 is built into the lower end of vacuum chamber 1 immediately below the terminal end of the lowermost drying conveyor 3 and is connected to a chamber 4 by a vacuum lock. A vacuum pump 38 is connected to chamber 4 to evacuate it.

Condensers 13 and a vacuum pump 32 are connected to the vacuum drying chamber to continuously evacuate it.

In operation the product to be freeze dried is added in the form of large frozen chunks into the feed hopper 11 while the vacuum lock 24 is closed. Vacuum pump 22 is activated to evacuate the feed hopper 11 to the subatmospheric pressure which prevails in the vacuum chamber 1. The lock is then opened and the large chunks continuously pass into the internal feed hopper 11l. Particles continually flow out of the discharge opening 12 in the bottom of the internal feed hopper, appropriate mechanism (such as a stirrer) being supplied to assist this flow if desired. The large chunks move along the first screening and conveyor section 2a in response to the forward action of its vibratory drive mechanism 26. Particles which are already at the desired optimum size for freeze drying pass through the openings 28 and fall onto the second screening conveyor 2b, from which they thereafter fall through to the third screening conveyor section 2c and eventually to the drying beds 3. The larger chunks on the vibratory screening conveyor are turned to the first comminution device 21 which breaks most of them to the desired particle size for freeze drying. The comminuted particles are moved along conveyor screening section 2b. During this movement most pass to the lowermost screening conveyor section 2c. Any particles which do not pass through the openings are further comminuted in the second comminution device 21 and are carried along the third screening conveyor section 2c to the vibratory drying beds 3. The particles move successively along these beds, and while moving are subjected to the heating action of the double-walled drying bed.

The heat supplied here by the double-walled drying beds sublimates the ice present in the particles since the vacuum pump 32 and the condensers 13 are so arranged as to maintain the pressure within vacuum chamber 1 below that at which thawing can take place.

The dried product discharged from the vibratory drying beds is continuously accumulated in hopper 34 and periodically passed through the vacuum lock 30 to chamber 4 after it has been evacuated by vacuum pump 38. Thereafter the dried product is removed from chamber 4.

Referring now to FIG. 2 there will be seen still another embodiment of the invention. This is generally similar to the embodiment of FIG. 1, and corresponding parts have corresponding reference numerals. The vacuum chamber 1 however is longer than that of the FIG. 1 device with the screening conveyors being located at one end 1a of the chamber and the drying beds 3 located at the other end 1b. A helical vibratory conveyor 5 is arranged between the two.

Conveyor 5 has a helical bed 34 arranged about a vertical axis. The lower end 36 of the helical bed is disposed at the terminal end of the lowermost screening conveyor 2c. Lowermost screening conveyor 2c lacks the openings 28 so that it retains screened particles reaching it from the conveyor sections 2a, and 2b above it and from the second comminution device 21. The upper end 38 of the helical drying conveyor is located above the initial end of the uppermost vibratory drying bed 3. A vibratory drive mechanism 40 including leaf springs 40a and an electromagnet 40b are arranged to give a quick forward, slow return rotation of the conveyor bed 34 in a direction to move particles upwardly on the helical conveyor.

Referring now to FIG. 3 still another embodiment of the invention will be seen. Within a vacuum chamber (not shown) a feed hopper 50 has its outlet opening 52 arranged above a screening conveyor section 2a'. Screening conveyor section 2a' is a plate removably mounted above a vibratory drying bed 3a' for movement therewith. The screening sections 2a' and the drying beds 3a' are in heat-conducting communication since the parts are made of a material such as metal having good heat conductivity and are in contact with each other. As a result the entire drying process is accelerated because water vapor is continuously extracted from the material both during the screening phase and during the drying phase. As a result the drying time required is reduced.

A vibratory drive mechanism 26' is arranged to move screening conveyor section 2a' and drying bed 3a' together. A heating chamber 54a is formed on the lower side of drying bed 3a' and has an inlet 55a and an outlet 56a for a heating fluid such as hot steam. At the terminal end of screening conveyor section 2a' there is located a chute 58 which delivers particles not passing through openings 28' in screening section 2a' to a comminution device 21'. At the terminal end of vibratory drying bed 3a' there is located a chute 60 which receives such particles as are passed through the openings 28'.

Both the outlet of chute 60 and of the comminution device 21' deliver products onto a vibratory screening section 2b' which is connected to a vibratory drying bed 3b' which are structurally identical to screening section 2a and drying bed 3a. An associated vibratory drive mechanism 26' is arranged to drive the sections 2b' and 3b' in a direction opposite to that in which the sections 2a' and 3a' are driven. Similar screening sections 2c' and drying bed 3c' are located below 2b' and 3b' for receiving particles.

Thawing need not be feared since, as a result of the fact that a reduced pressure is maintained within the chamber any heat added simply serves to sublimate the ice.

The comminution device 21, 21' is a tooth-disc mill sold as Type LV 15 of the Condux-Werke KG, Wolfgang near Hanau, Germany.

It will be understood that the above description of the present invention is susceptible to various modifications, changes and adaptations.

We claim:

1. A method of continuous freeze drying comprising, in combination, the steps of:
   a. comminuting within a vacuum chamber large chunks of frozen material into particles of a desired size,
   b. thereafter screening the particles within the vacuum chamber to separate particles of other than the desired size, and
   c. adding heat within the vacuum chamber to sublime the ice within the particles and freeze dry them.

2. The method of claim 1 wherein said heat is added by conduction.

3. The method of claim 2 wherein said heat is added by conducting steam through closed ducts passing through said vacuum chamber.

4. The method of claim 1 comprising further comminuting the particles of larger than the desired size, and screening and adding heat to the particles of desired size generated by the further comminuting action for freeze drying them.

5. The method of claim 4, comprising transporting the articles through the vacuum chamber from where they are comminuted to where they are screened to where they are heated and simultaneously carrying out the screening step so that larger particles are subjected to the transporting step than smaller particles.

6. An apparatus for continuous freeze drying the improvement comprising:
   a. vacuum chamber means for maintaining a subatmospheric pressure,
   b. means for supplying frozen material in relatively large chunks to the interior of the chamber while maintaining subatmospheric pressure,
   c. a plurality of individual screening means for separating particles of a desired size from larger particles,
   d. means for moving particles along one of said screening means in one direction and thereafter along another of said screening means in an opposite direction,
   e. means located at one end of each of said screening sections for comminuting said frozen particles,
   f. means located within said vacuum chamber including a bed connected to said screening means for receiving said screened particles,
   g. means for vibrating said bed, and
   h. means for heating said particles on said bed means for drying the particles.

7. The improvement defined in claim 6 including vibratory drying means for moving particles along each of said screening means.

8. The improvement defined in claim 6 wherein said screening means are made of a material having good heat-conducting properties.

9. The improvement defined in claim 6 including helical conveyor means arranged about a vertical axis, and located at the end of said screening means and arranged to deliver particles screened by said screening means to said drying bed means, and means for moving said particles upwardly on said helical conveyor means to deliver the particles from the said screening means to the said drying bed means.

10. The improvement defined in claim 6 wherein said drying bed means is a helical conveyor.

11. The improvement defined in claim 6 wherein said screening means is located directly above said drying bed means, and including means for removably connecting the screening means to the drying bed means, and means for conducting heat from the drying bed means to the screening means.

12. The improvement defined in claim 6 wherein said screening means are disposed one above the other.

13. The improvement defined in claim 12 wherein said heating means is disposed below said screening means.

14. The improvement as defined in claim 6 wherein said heating means is disposed in horizontal alignment with said screening means.